United States Patent [19]

Mark

[11] 4,075,164

[45] * Feb. 21, 1978

[54] FLAME RETARDANT POLYCARBONATE COMPOSITION

[75] Inventor: Victor Mark, Evansville, Ind.

[73] Assignee: General Electric Company, Pittsfield, Mass.

[*] Notice: The portion of the term of this patent subsequent to Feb. 24, 1993, has been disclaimed.

[21] Appl. No.: 642,993

[22] Filed: Dec. 22, 1975

Related U.S. Application Data

[63] Continuation-in-part of Ser. No. 429,120, Dec. 28, 1973, Pat. No. 3,940,366.

[51] Int. Cl.² .................................................. C08K 5/42
[52] U.S. Cl. .......................... 260/45.7 S; 260/79.3 R; 260/823

[58] Field of Search ................... 260/45.7 S, 79.3, 823

[56] References Cited

U.S. PATENT DOCUMENTS

| | | | |
|---|---|---|---|
| 3,686,362 | 8/1972 | Hinckley et al. | 260/45.95 |
| 3,775,367 | 11/1973 | Nouverné | 260/45.7 |
| 3,940,366 | 2/1976 | Mark | 260/45.7 |

*Primary Examiner*—V. P. Hoke
*Attorney, Agent, or Firm*—William F. Mufatti

[57] ABSTRACT

A flame retardant polycarbonate composition comprising in admixture an aromatic carbonate polymer and a flame retardant additive which may be the metal salts of either mixtures of monomeric and polymeric substituted aromatic sulfonic acids, or polymeric substituted aromatic sulfonic acids.

11 Claims, No Drawings

FLAME RETARDANT POLYCARBONATE COMPOSITION

This application is a Continuation in part of U.S. Patent Application Ser. No. 429,120, filed Dec. 28, 1973, now U.S. Pat. No. 3,940,366, issued Feb. 24, 1976.

This invention is directed to a flame retardant polycarbonate composition and in particular an aromatic polycarbonate containing in admixture therewith a particular flame retardant additive which may be the metal salts of either mixtures of monomeric and polymeric aromatic sulfonic acids, or polymeric substituted aromatic sulfonic acids.

BACKGROUND OF THE INVENTION

With the increasing concern for safety, there is a positive move towards providing safe materials for public and household use. One particular area of need is that of providing flame resistant or flame retardant products for use by the ultimate consumer. As a result of this demand, many products are being required to meet certain flame retardant criteria both by local and federal government and the manufacturers of such products. One particular set of conditions employed as a measuring standard for flame retardancy is set forth in Underwriters' Laboratories, Inc. Bulletin 94. This Bulletin sets forth certain conditions by which materials are rated for self-extinguishing characteristics.

In the art, there are many known flame retardant additives which are employed by mixing with products to render such materials self-extinguishing or flame retardant. Such flame retardant additives have been known to be employed in amounts of 5 to 20 weight percent in order to be effective in extinguishing burning of those products which are combustible. It has also been found that such amounts can have a degrading effect upon the base product to be rendered flame retardant, resulting in the losses of valuable physical properties of the base product. This is particularly so when employing known flame retardant additives with the base product polycarbonate resins. Many of these known additives have a degrading effect upon the polymer.

DESCRIPTION OF THE INVENTION

It has now been surprisingly discovered that an aromatic polycarbonate can be made flame retardant by incorporating with the aromatic polycarbonate minor amounts of certain additives, which additives are inert and do not degrade the aromatic polycarbonate. The particular additive employed herein is unique in that even very minor amounts render the aromatic polycarbonate flame retardant. The amount of the additive employed herein can vary, preferably, from 0.01 to about 10 weight percent based on the weight of the aromatic polycarbonate.

More specifically, the particular additive of this invention is the metal salt of either mixtures of monomeric and polymeric substituted aromatic sulfonic acid or polymeric substituted aromatic sulfonic acids. The metal salt employed in the practice of this invention is either the alkali metal or alkaline earth metal salt and mixtures thereof. The metals of these groups are sodium, lithium, potassium, rubidium, cesium, beryllium, magnesium, calcium, strontium and barium.

The aromatic sulfonic acid employed in the practice of this invention is a substituted aromatic sulfonic acid wherein the substituent consists of an electron withdrawing radical. As employed herein and within the scope of this invention, any of the electron withdrawing radicals can be employed in the practice of this invention. However, preferably, the electron withdrawing radical or substituent employed in the practice of this invention is the halo-, nitro-, trihalomethyl and cyano electron withdrawing radicals or mixtures of these electron withdrawing radicals.

The electron withdrawing phenomenon, or as it is also referred to as electronegativity, is defined in *Basic Principles of Organic Chemistry* by Roberts and Caserio, 1964 (pages 185–186), and *Physical Organic Chemistry* by Jack Hine, McGraw-Hill Book Company, Inc. 1962 (pages 5, 32 and 85–93). Briefly, the electron withdrawing phenomenon is where the radical has a strong affinity for a negative charge, namely electrons, but still remains covalent and does not form an ion. This is an extremely brief description of this phenomenon and is merely set forth here to describe the electron withdrawing effect. Reference should be made to the texts set forth above.

In the practice of this invention, the types of sulfonic acids employed herein may be either mixtures of the monomeric form and polymeric form or polymeric form. When first considering the monomeric form, the metal salt of the substituted monomeric aromatic sulfonic acid can best be represented by the following formula:

   I.

wherein $A$ and $B$ can, in turn, be independently selected from the following formula:

$$R'_x(SO_3M)_y R''$$   II.

wherein $R'$ is an electron withdrawing radical, M is a metal which may be selected from the periodic table of either an alkali metal or an alkaline earth metal, $R''$ is an aryl radical of 1–4 aromatic rings, $x$ is an integer of 0–17 and $y$ an integer of 0–10. It is to be understood, however, that $x$ in Formula II must equal at least 1 and $y$ in Formula II must equal at least 1.

In Formula I above, $R$ is an organic radical of 1–20 carbon atoms and is either alkayl, aralkyl, alkenyl, aralkenyl, aryl, arylene, alkylene, aralkylene, alkenylene, aralkenylene, alkylidene, aralkylidene, alkenylidene or aralkenylidene. It should also be understood that the radical $R$ can also contain halogen substituents which would be an electron withdrawing radical. However, this would be in addition to the above requirement that in Formula II the sum of $x$ must be at least 1.

In the above Formula I, the combination of the electron withdrawing radical and the ($SO_3M$) radical is the novel feature of the instant invention that offers the excellent flame retardant properties when admixed with an aromatic polycarbonate. Preferably, for optimum results, the electron withdrawing radical and the ($SO_3M$) radical should be on the same aromatic ring, namely either in $A$ or $B$ of Formula I above. As further indicated above in Formula I in its simplest form, the flame retardant additive can consist merely of $B$ which in turn would be simply Formula II. This is shown where $A$ and $R$ may be (0).

Obviously, the simplest formula may be as follows:

and more specifically

Actually, while there are many compounds that meet the requirements of Formula I and which offer excellent flame retardant characteristics to an aromatic polycarbonate, the preferred additive employed in the monomeric form is the sodium salt of 2,4,5-trichlorobenzenesulfonic acid. This has the following formula:

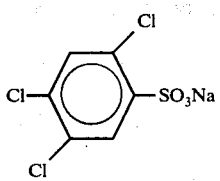

Mixtures of the various metal salts of the monomeric substituted sulfonic acids can be employed herein.

The polymeric form of the substituted aromatic sulfonic acid can best be represented by the following formula:

     III.

wherein $\boxed{A}$ and $\boxed{B}$ are independently selected from the following formula:

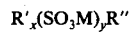     IV.

wherein R', M, R'', x and y have the same meaning as recited previously. In addition, the same requirements for x and y apply. However, it is also understood that $\boxed{A}$ and $\boxed{B}$ units can be randomly selected. In addition $\boxed{R_1}$ is an organic radical of 1-20 carbon atoms and is either arylene, alkylene, aralkylene, alkenylene, aralkenylene, alkylidene, aralkylidene, alkenylidene and aralkenylidene. In the polymeric form, $\boxed{R_1}$ cannot be monovalent as in the case of monomeric form of the additive employed herein and described by Formula I. In Formula III, the sum of m and n must be at least 4 and can be as high as 2000. As shown, the selection of m and n can be random or equal or one can be (0). In Formula III, $R_1$ can also contain halogen substituents which would be an electron withdrawing radical. However, this would be in addition to the requirement that in Formula III, the sum of x must be at least 1.

In the practice of this invention, it is to be understood that the polymeric structure can be either a homopolymer, a copolymer, a random copolymer, a block copolymer or a random-block copolymer including mixtures thereof. In addition, the ratio of sulfonated aromatic rings to unsulfonated aromatic rings can vary from greater than 1 to 1 to as high as that which is barely necessary to render the polycarbonate flame retardant and this may be 1 to 100.

Mixtures of the monomeric form and polymeric form are employed in the practice of the instant invention.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE I 99 parts of an aromatic polycarbonate, prepared by reacting 2,2-bis(4-hydroxyphenyl)propane and phosgene in the presence of an acid acceptor and a molecular weight regulator and having an intrinsic viscosity of 0.57 is mixed with 1 part of a finely ground dehydrated additive listed in Table I by tumbling the ingredients together in a laboratory tumbler. The resulting mixture is then fed to an extruder, which extruder is operated at about 265° C., and the extrudate is comminuted into pellets.

The pellets are then injection molded at about 315° C into test bars of about 5 in. by ½ in. by about 1/16-⅛ in. thick. The test bars (5 for each additive listed in the Table) are subject to the test procedure set forth in Underwriters' Laboratories, Inc. Bulletin UL-94, Burning Test for Classifying Materials. In accordance with this test procedure, materials so investigated are rated either SE-0, SE-I or SE-II based on the results of 5 specimens. The criteria for each SE rating per UL-94 is briefly as follows:

"SE-0": Average flaming and/or glowing after removal of the igniting flame shall not exceed 5 seconds and none of the specimens shall drip flaming particles which ignite absorbent cotton.

"SE-I": Average flaming and/or glowing after removal of the igniting flame shall not exceed 25 seconds and the glowing does not travel vertically for more than ⅛ inch of the specimen after flaming ceases and glowing is incapable of igniting absorbent cotton.

"SE-II": Average flaming and/or glowing after removal of the igniting flame shall not exceed 25 seconds and the specimens drip flaming particles which ignite absorbent cotton. In addition, a test bar which continues to burn for more than 25 seconds after removal of the igniting flame is classified, not by UL-94, but by the standards of the instant invention, as "burns". Further, UL-94 requires that all test bars must meet the SE type rating to achieve the particular rating. Otherwise, the 5 bars receive the rating of the worst single bar. For example, if one bar is classified as SE-II and the other 4 are classified as SE-0, then the rating for all 5 bars is SE-II.

The results of the different additives within the scope of the instant invention are as follows with a control being the aromatic polycarbonate as prepared above without the additive of the type set forth herein.

Table 1

| Additive (1.0 weight percent) | Flame Out Time Seconds (Avg.) | No. of Drips Per Test Bar | Rating | Remarks |
|---|---|---|---|---|
| *Calcium salt of [structure: phenyl rings with CCl₃, SO₃H, H, Cl substituents, subscripts n and m] having one sulfonate group in 10.6 repeating units and a weight average molecular weight of about 5000. | 2.8 | 0.4 | SE-O | |
| *Sodium salt of [structure: phenyl rings with CCl₂, SO₃H, Cl substituents, subscripts n and m] having one sulfonate group in 10.6 repeating units and a weight average molecular weight of about 5000. | 1.6 | 0.2 | SE-O | |
| Sodium 4,2′,3′,4′,5′,6′,4″-heptachlorotriphenylmethane-3-sulfonate | 2.0 | 0 | SE-O | |
| Sodium salt of poly(monochlorostyrene)-sulfonic acid containing one sulfonate group per 5.4 phenyl rings. | 3.1 | 0.4 | SE-O | |
| *Sodium salt of [structure: phenyl rings with $C_6Cl_5$, SO₃H, H, Cl substituents, subscripts n and m] having one sulfonate group in 16.6 repeating units and weight average molecular weight of about 1200. | 1.6 | 0 | SE-O | |
| *Sodium salt of [structure: phenyl rings with CH=$C_6H_2Cl_3$, SO₃H, Cl substituents, subscripts n and m] having one sulfonate group in 22 repeating units and weight average molecular weight of about 2060. | 3.6 | 0.4 | SE-II | 2 test bars were SE-O |
| *Sodium salt of [structure: naphthalene rings with CH₂, Cl, SO₃H substituents, subscripts m and n] having one sulfonate group in 8.2 repeating units and weight average molecular weight of 860. | 5.2 | 0.8 | SE-II | |

*As determined by elemental analysis

EXAMPLE II

This Example is set forth to demonstrate the effect of the flame retardant additives of this invention at the lower limits of 0.04 weight percent based on the weight of the polymer composition.

In preparing the test bars for this Example, 99.96 parts of the polycarbonate of Example I is mixed with 0.04 weight percent of the additives listed in Table 2 employing the same procedure. Test bars are then molded using the same procedure employed in Example I. The test bars are subjected to the same test procedure of Example I with the following results:

Table 2

| Additive (0.04 weight percent) | Flame Out Time Seconds (Avg.) | No. of Drips Per Test Bar | Rating | Remarks |
|---|---|---|---|---|
| Potassium salt of 1:1 poly(monochlorostyrene)-polystrene copolymer sulfonic acid containing 1 sulfonate group | 3.6 | 0 | SE-O | |

Table 2-continued

| Additive (0.04 weight percent) | Flame Out Time Seconds (Avg.) | No. of Drips Per Test Bar | Rating | Remarks |
|---|---|---|---|---|
| per 10.2 phenyl rings Potassium salt of 1:2 poly(dibromostyrene)- polystyrene copolymer sulfonic acid containing 1 sulfonate group per 14.1 phenyl rings. | 2.2 | 0 | SE-O | |

EXAMPLE III

This Example is set forth to demonstrate the effect of the flame retardant additives of this invention at the lower limits of 0.01 weight percent based on the weight of the polymer composition.

In preparing the test bars for this Example, 99.99 parts of the polycarbonate of Example I is mixed with 0.01 weight percent of the additives listed in Table 2 employing the same procedure. Test bars are then molded using the same procedure employed in Example I. The test bars are subjected to the same test procedure of Example I with the following results:

Table 3

| Additive (0.01 weight percent) | Flame Out Time Seconds (Avg.) | No. of Drips Per Test Bar | Rating | Remarks |
|---|---|---|---|---|
| Sodium salt of poly(p-chlorostyrene)- sulfonic acid containing one sulfonte group per 5.4 phenyl rings. | 7.8 | 2.6 | SE-II | |
| Sodium salt of | 5.2 | 2.4 | SE-II | |

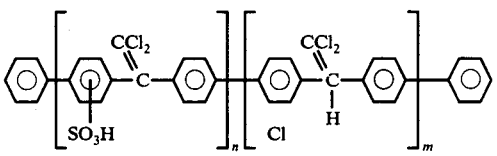

having one sulfonate group in 10.6 repeating units and a weight average molecular weight percent of about 5000.

EXAMPLE IV

This Example is set forth to demonstrate the effect of a mixture of flame retardant additives of this invention.

In preparing the test bars for this Example, 99.70 parts of the polycarbonate of Example I is mixed with 0.10 weight percent of the monomeric additive and 0.2 weight percent of the polymeric additive listed in Table 4 employing the same procedure. Test bars are then molded using the same procedure employed in Example I. The test bars are subjected to the same test procedure of Example I with the following results:

Table 4

| Additive | Flame Out Time Seconds (Avg.) | No. of Drips Per Test Bar | Rating | Remarks |
|---|---|---|---|---|
| Mixture of 0.1 weight percent of sodium 2,4,5-trichlorobenzene sulfonate and 0.2 weight percent of the sodium salt of poly(mono- chlorostyrene) sulfonic acid containing 1 sulfonate group per 5.4 phenyl rings. | 4.2 | 0 | SE-O | |

EXAMPLE V

This Example is set forth to show the effect of a known, commercially available flame retardant additive.

A.

Example I is repeated except that in place of the additives employed therein, only 1 part 1,2,5,6,9,10-hexabromocyclododecane is used herein. The results obtained upon evaluating 5 test bars are the same as obtained for the Control shown in Table 1 above.

B.

Part A. above is repeated but using 5 weight percent of the above additive, namely 1,2,5,6,9,10-hexabromocyclododecane. The results obtained are the same as obtained in Part A. above.

C.

Part A. above is repeated but using 10 weight percent of the above additive, namely 1,2,5,6,9,10-hexabromocyclododecane. At this level of additive, test bars are rated SE-II. However, the polycarbonate is badly degraded as evidenced by severe dark streaking of the molded test bars, which degradation does not occur with the additives of the instant invention.

EXAMPLE VI

Example V is repeated except that hexabromobiphenyl is employed herein. The results obtained are essentially the same as those of Example V.

EXAMPLE VII

Example V is repeated except that the additive employed herein is a combination of antimony oxide and a material which is a mixture of polychlorinated biphenyl (Aroclor by Monsanto Company). The proportion of the ingredients of the additive employed in this example is based on 3 parts of chlorine per 1 part of antimony. The results obtained at 1 weight percent and 5 weight percent amounts are the same as in Example V.

However, at the higher amount, namely 10 weight percent, flame retardancy effect is noted but with, again, severe degradation of the polycarbonate, as evidenced by the substantial reduction in the intrinsic viscosity of the molded test bars. As molded, the intrinsic viscosity of the test bars with 1 weight percent of the above additive is about 0.50. The intrinsic viscosity of the molded test bars containing 10 weight percent of the flame retardant additive of this Example is 0.253. This shows the severe degradation of the polycarbonate when employing this type of well known flame retardant.

In the practice of this invention, aromatic carbonate polymers are rendered flame retardant by the addition of certain particular additives which are the metal salts of mixtures of monomeric and polymeric sulfonic acids or polymeric sulfonic acids. The amounts of the additives employed in the practice of this invention may vary from 0.01 to up to that amount which, after further increasing, does not materially increase the flame retardant properties of the polycarbonate. This is generally up to about 10 weight percent based on the weight of the aromatic carbonate polymer but may be higher. The amount of the additive to be employed can also be a function of the degree of flame retardancy desired.

The novelty of the instant invention is achieved by the sulfonic radical ($SO_3M$) on the aromatic rings. It is not exactly understood how the additive of this invention functions or how such minor amounts can act as an effective flame retardant for the aromatic carbonate polymer. Analysis of the composition of this invention after being subjected to a fire temperature of about 600° C shows an unusually high percentage of remaining char. This leads one to hypothesize that the additive may act as a cross-linking agent when the aromatic carbonate polymer is subjected to fire temperatures. However, it is emphasized that this is only theory and should not be construed as actually occurring.

As indicated previously, the additive of the instant invention comprises the alkali or alkaline earth metal salts of mixtures of monomeric and polymeric aromatic sulfonic acids or polymeric aromatic sulfonic acids. While a great number of such salts are set forth in the tables of the Examples of the instant invention, these are only a representative sample of the additives of this invention. The sodium, calcium, magnesium, potassium, strontium, lithium, barium, rubidium and cesium salts of other aromatic sulfonic acids can be employed in place of those of the Examples with the same effective flame retardancy being achieved. These other aromatic sulfonic acids include p-fluorobenzene sulfonic acid
2,3,4,5-tetrafluorobenzenesulfonic acid
pentafluorobenzenesulfonic acid
p-chlorobenzenesulfonic acid
2,4-dichlorobenzenesulfonic acid
p-bromobenzenesulfonic acid
2,5-dibromobenzenesulfonic acid
2-bromo-4-chlorobenzenesulfonic acid
2-chloro-4-bromobenzenesulfonic acid
2-bromo-5-chlorobenzenesulfonic acid
2-chloro-5-bromobenzenesulfonic acid
2,3,4-trichlorobenzenesulfonic acid
2,4,6-trichlorobenzenesulfonic acid
2,3,4,5-tetrachlorobenzenesulfonic acid
2,3,5,6-tetrachlorobenzenesulfonic acid
2,3,4,6-tetrachlorobenzenesulfonic acid
pentachlorobenzenesulfonic acid
1-chloronaphthalane-x-sulfonic acid
1,x-dichloronaphthalene-y-sulfonic acid
1-bromonaphthalene-x-sulfonic acid
4,5-dichlorobenzene-1,3-disulfonic acid In the practice of this invention, the additive is generally prepared by well known methods in the art. For example, one such well known method involves taking an aromatic hydrocarbon such as benzene and contacting it with either of the electron withdrawing components such as through chlorination, bromination or nitration. This is then subjected to sulfonation using either sulfuric acid, chlorosulfonic acid, fuming sulfuric acid or sulfur trioxide. These reactions can be carried out at room temperature or at elevated temperatures such as about 50° C. Alternatively, the order of the above reaction can be reversed. The salt is then prepared by adding the proper alkaline reagent in sufficient amount to make the neutral salt. The salt is then recovered by precipitation or by distillation of the solvent.

In the case of the trihalomethyl electron withdrawing substituent, such as trifluoromethyl electron withdrawing substituent, it is best to start with the prepared trifluoromethyl aromatic hydrocarbon and then sulfonate as above, as well as preparing the salt thereof.

In the case of the cyano-substituent, it is best to prepare the sulfonic acid by oxidation of the corresponding thiophenol by hydrogen peroxide or organic peracids. The salt is then made as above and recovered accordingly. This technique is also best for the preparation of sulfonic acids with the trichloromethyl substituent.

In the practice of this invention, any of the aromatic polycarbonates can be employed herein. These are homopolymers and copolymers and mixtures thereof that are prepared by reacting a dihydric phenol with a carbonate precursor. Typical of some of the dihydric phenols that may be employed in the practice of this invention are bisphenol-A, (2,2-bis(4-hydroxyphenyl)propane), bis(4-hydroxyphenyl)methane, 2,2-bis(4-hydroxy-3-methylphenyl)propane, 4,4-bis(4-hydroxyphenyl)heptane, 2,2-(3,5,3',5'-tetrachloro-4,4'-dihydroxydiphenyl)propane, 2,2-(3,5,3',5'-tetrabromo-4,4'-dihydroxydiphenyl)propane, (3,3'-dichloro-4,4'-dihydroxyphenyl)methane. Other dihydric phenols of the bisphenol type are also available and are disclosed in U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbaonte precursor may be either a carbonyl halide, a carbonate ester or a haloformate. The carbonyl halides which can be employed herein are carbonyl bromide, carbonyl chloride and mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorophenyl) carbonate, di-(tribromophenyl) carbonates, etc., di-(alkylphenyl) carbonates such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic carbonate polymers of this invention may be prepared by employing a molecular weight regulator, an acid acceptor and a catalyst. The molecular weight regulators which can be employed in carrying out the process of this invention include monohydric phenols such as phenol, chroman-I, paratertiarybutylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include tertiary amines such as for example, triethylamine, tripropylamine, N,N-dimethylaniline, quaternary ammonium compounds such as, for example, tetraethylammonium bromide, cetyl triethyl ammonium bromide, tetra-n-hyptylammonium iodide, tetra-n-propyl ammonium bromide, tetramethylammonium chloride, tetramethyl ammonium hydroxide, tetra-n-butylammonium iodide, benzyltrimethylammonium chloride and quaternary phosphonium compounds such as, for example, n-butyltriphenyl phosphonium bromide and methyltriphenyl phosphonium bromide.

Also, included herein are branched polycarbonates wherein a polyfunctional aromatic compound is reacted with the dihydric phenol and carbonate precursor to provide a thermoplastic randomly branched polycarbonate.

These polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polycarbonate and a branched polycarbonate.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. A flame retardant aromatic carbonate polymer composition comprising in admixture an aromatic carbonate polymer and a minor amount of a mixture of a metal salt of a monomeric substituted aromatic sulfonic acid and a polymeric substituted aromatic sulfonic acid or a polymeric substituted aromatic sulfonic acid, and wherein said metal salts thereof are selected from the group consisting of the alkali metal salts and the alkaline earth metal salts, and mixtures thereof, and said substituent on the metal salts of the substituted aromatic sulfonic acid is selected from the group consisting of an electron withdrawing radical and mixtures thereof.

2. The composition of claim 1 wherein the composition comprises 0.01 to about 10 weight percent of the additive based on the weight of the aromatic carbonate polymer composition.

3. The composition of claim 1 wherein the metal salt of the substituted polymeric aromatic sulfonic acid has the following formula:

wherein $R_1$ is selected from the group of organic radicals consisting of halogen substituted and unsubstituted arylene, alkylene, aralkylene, alkenylene, aralkenylene, alkylidene, aralkylidene, alkenylidene and aralkenylidene radicals of 1-20 carbon atoms and wherein A and B are independently selected from the following formula:

$$R'_x(SO_3M)_y R''$$

wherein M is a metal selected from the group consisting of alkali metal and alkaline earth metal, R' is an electron withdrawing radical, R" is an aryl radical of 1-4 aromatic rings, $x$ is an integer of 0–17, $y$ is an integer of 0–10, provided that the sum of $x$ must equal at least 1 and the sum of $y$ must equal at least 1; and further wherein $m$ is an integer of from 0–2000 and $n$ is an integer from 0–2000 provided, however, that the sum of $m$ and $n$ must equal at least 4.

4. The composition of claim 1 wherein the metal salt of the substituted monomeric aromatic sulfonic acid has the following formula:

wherein R is selected from the group of organic radicals consisting of halogen substituted and unsubstituted alkyl, aralkyl, alkaryl, aralkenyl, aryl, arylene, alkylidene, aralkylidene, alkenylidene and aralkenylidene radicals of 1-20 carbon atoms, and wherein A and B are independently selected fron the following formula:

$$R'_x(SO_3M)_y R''$$

wherein M is a metal selected from the group consisting of alkali metal and alkaline earth metal, R' is an electron withdrawing radical, R" is an aryl radical of 1 to 4 aromatic rings, $x$ is an integer of 0–17, $y$ is an integer of 0–10, provided that the sum of $x$ must equal at least 1 and the sum of $y$ must equal at least 1.

5. The composition of claim 1 wherein the electron withdrawing radical is selected from the group consisting of halogen, nitro, trihalomethyl and cyano and mixtures thereof.

6. The composition of claim 1 wherein the electron withdrawing radical is a chlorine.

7. The composition of claim 1 wherein the electron withdrawing radical is trifluoromethyl.

8. The composition of claim 1 wherein the metal salt of the substituted monomeric aromatic sulfonic acid is the sodium salt of the sulfonic acid derived from ortho dichlorobenzene.

9. The composition of claim 1 wherein the metal salt of the substituted monomeric aromatic sulfonic acid is the sodium salt of pentachlorobenzenesulfonic acid.

10. The composition of claim 1 wherein the metal salt of the substituted monomeric aromatic sulfonic acid is the disodium salt of 2,5-dichlorobenzene-1,3-disulfonic acid.

11. The composition of claim 1 wherein the metal salt of the substituted polymeric aromatic sulfonic acid is the sodium salt of sulfonated poly-(chlorostyrene).

* * * * *